(12) United States Patent
Garris et al.

(10) Patent No.: US 8,313,608 B2
(45) Date of Patent: Nov. 20, 2012

(54) METHOD OF ALIGNING AN IMAGING DEVICE IN AN OPTICAL SYSTEM

(75) Inventors: William Eric Garris, Salem, VA (US); Scott Adams, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 97 days.

(21) Appl. No.: 12/887,825

(22) Filed: Sep. 22, 2010

(65) Prior Publication Data
US 2012/0066887 A1 Mar. 22, 2012

(51) Int. Cl.
- *B32B 7/08* (2006.01)
- *B32B 7/14* (2006.01)
- *B32B 37/00* (2006.01)
- *B29C 65/00* (2006.01)
- *C09J 163/00* (2006.01)
- *G02B 23/12* (2006.01)

(52) U.S. Cl. .......... 156/294; 156/92; 156/291; 156/330; 359/353

(58) Field of Classification Search .................... 156/60, 156/91, 92, 99, 108, 182, 242, 245, 290, 156/291, 292, 293, 294, 297, 298, 299, 303.1, 156/304.1, 304.2, 304.3, 305, 307.1, 307.3, 156/307.5, 307.7, 325, 326, 327, 330; 359/350, 359/353, 355, 356, 362, 399, 642, 808, 811
See application file for complete search history.

(56) References Cited

U.S. PATENT DOCUMENTS

| | | | |
|---|---|---|---|
| 5,604,630 A | 2/1997 | Palmer | |
| 5,715,099 A * | 2/1998 | Takemoto | ..................... 359/819 |
| 5,745,287 A | 4/1998 | Sauter | |
| 7,482,571 B2 | 1/2009 | Thomas | |
| 7,525,081 B2 * | 4/2009 | Toyoda et al. | ............. 250/208.1 |
| 2002/0122302 A1 | 9/2002 | Palmer | |
| 2002/0154419 A1 * | 10/2002 | Shoji et al. | ..................... 359/819 |
| 2003/0197786 A1 * | 10/2003 | Hirunuma et al. | ....... 348/207.99 |
| 2007/0103796 A1 | 5/2007 | Floyd et al. | |

FOREIGN PATENT DOCUMENTS

| | | |
|---|---|---|
| EP | 1677133 A1 | 7/2006 |
| EP | 2187425 A2 | 5/2010 |

OTHER PUBLICATIONS

European Application Serial No. 11182151.8, Extended European Search Report dated Dec. 13, 2011, 9 pgs.

\* cited by examiner

*Primary Examiner* — Philip Tucker
*Assistant Examiner* — Brian R Slawski
(74) *Attorney, Agent, or Firm* — RatnerPrestia

(57) ABSTRACT

In an optical system including an optical bench and an imaging device that is configured to be mounted to the optical bench, a method of aligning the imaging device on the optical bench includes the steps of:

(1) inserting an alignment pin extending from a mounting surface of either the optical bench or the imaging device into a hole defined in the other of the optical bench and the imaging device;

(2) aligning the imaging device with respect to a target image by translating and/or rotating the imaging device on the mounting surface of the optical bench while the pin is inserted in the hole to meet pre-defined center pixel, scan line and/or resolution requirements of the optical system; and (3) applying epoxy to the pin and the hole to mount the optical bench to the imaging device.

13 Claims, 10 Drawing Sheets

METHOD OF ALIGNING AN IMAGING DEVICE IN AN OPTICAL SYSTEM

TECHNICAL FIELD

This invention generally relates to a method of aligning an imaging device in an optical system, such as, for example, a camera, camcorder, night vision goggle, or a night vision scope.

BACKGROUND OF THE INVENTION

An imaging device must be properly aligned within an optical system to meet pre-determined line of sight, image alignment and resolution requirements of the optical system. The optical system may be a camera, camcorder, night vision goggle, or night vision scope, for example. The imaging device may be an image intensifier tube or a digital imaging device, such as a CCD (charge coupled device) or a CMOS (complementary metal oxide semiconductor), for example. Misalignment between the imaging device and its objective lens, caused by a housing of the optical system results in distortion of an image that is being viewed by the optical system and the user of said system. There is a continuing need to further develop and refine imaging devices, methods for assembling imaging devices, and methods for assembling an imaging device to a housing (or other component) of an optical system to meet line of sight, image alignment and resolution requirements of the optical system.

SUMMARY OF THE INVENTION

According to an aspect of the invention, a method of aligning an imaging device on an optical bench includes the step of inserting an alignment pin, which extends from a mounting surface of either the optical bench or the imaging device, into a hole defined in the other of the optical bench and the imaging device. The imaging device is aligned with respect to a target image by translating and/or rotating the imaging device on the mounting surface of the optical bench while the pin is inserted in the hole to meet pre-defined center pixel, scan line and/or resolution requirements of the optical system. Epoxy or other liquid adhesive is applied to the pin and the hole, without shifting the position of the pin with respect to the hole, to mount the optical bench to the imaging device.

According to another aspect of the invention, a method of assembling the imaging device onto the optical bench includes the step of inserting an alignment pin, which extends from a mounting surface of an alignment fixture, into a hole defined in the imaging device. The imaging device is aligned with respect to a target image by translating and/or rotating the imaging device on the mounting surface of the alignment fixture while the pin is inserted in the hole to meet pre-defined center pixel, scan line and/or resolution requirements of the optical system. Epoxy or other liquid adhesive is applied to the pin and the hole to join the pin to the imaging device. The pin and the imaging device are removed from the alignment fixture without shifting the position of the pin with respect to the hole of the imaging device. The pin of the imaging device is inserted into a hole defined in the optical bench to assemble the imaging device onto the optical bench.

According to yet another aspect of the invention, a method of aligning the imaging device with respect to a target image includes the step of inserting an alignment pin, which extends from a mounting surface of an alignment fixture, into a hole defined in the imaging device. The imaging device is aligned with respect to a target image by translating and/or rotating the imaging device on the mounting surface of the alignment fixture while the pin is inserted in the hole to meet pre-defined center pixel, scan line and/or resolution requirements of the optical system. Epoxy or other liquid adhesive is applied to the pin and the hole to join the pin to the imaging device.

These and other aspects of the present invention will become clear from the detailed discussion below when taken into consideration with the drawings. It is to be understood that the following discussion is intended merely to illustrate the preferred embodiment of the present invention. However, the present invention is not limited to the illustrated embodiments, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawings are not to scale. Included in the drawing are the following figures.

DETAILED DESCRIPTION OF THE INVENTION

Figure 1A:
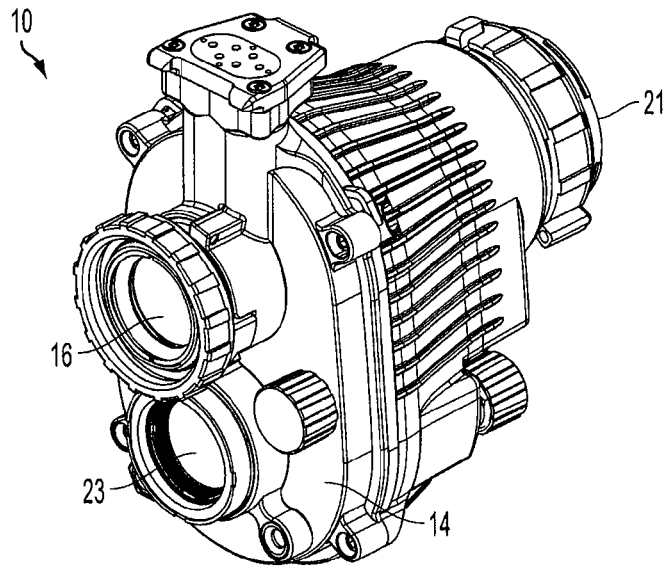
FIGS. 1A-1C depict perspective, front elevation and side elevation views, respectively, of a night vision monocular, according to an exemplary embodiment of the invention.
Figure 1B:
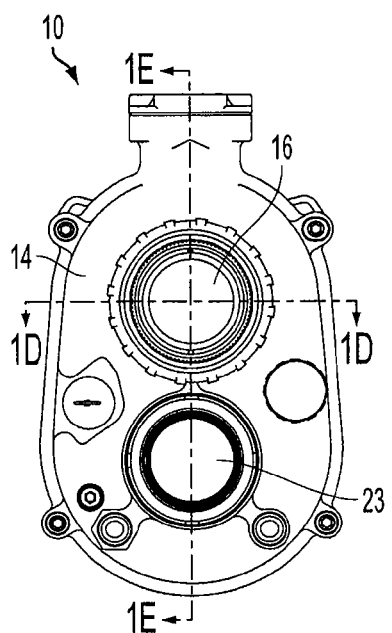
Figure 1C:
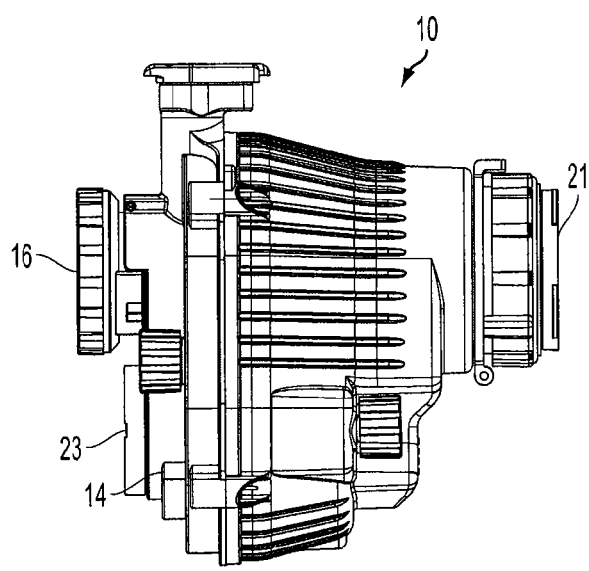
Figure 1D:
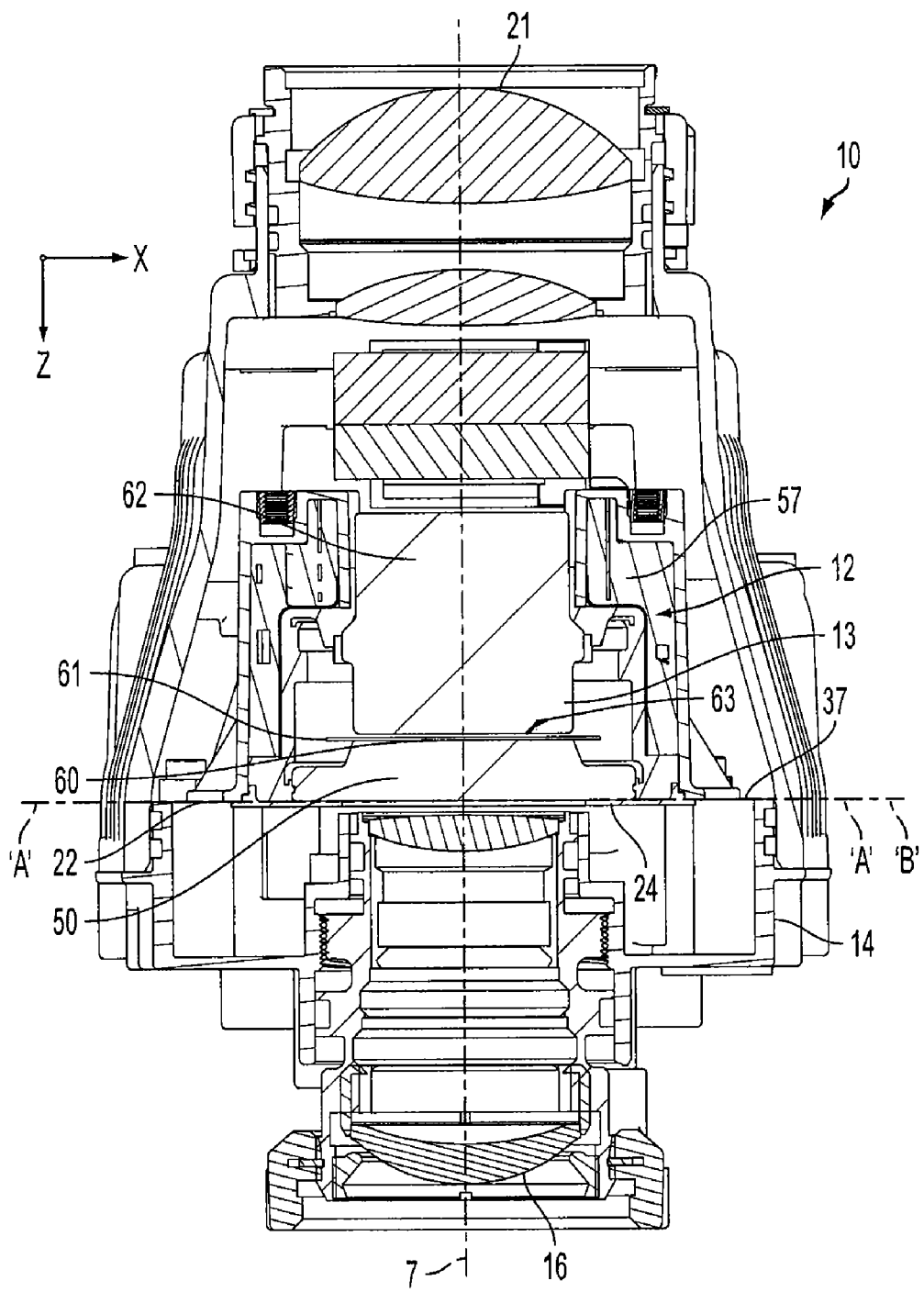
FIG. 1D depicts a cross-sectional view of the monocular of FIG. 1B taken along the lines 1D-1D, wherein several components of the monocular have been omitted.
Figure 1E:
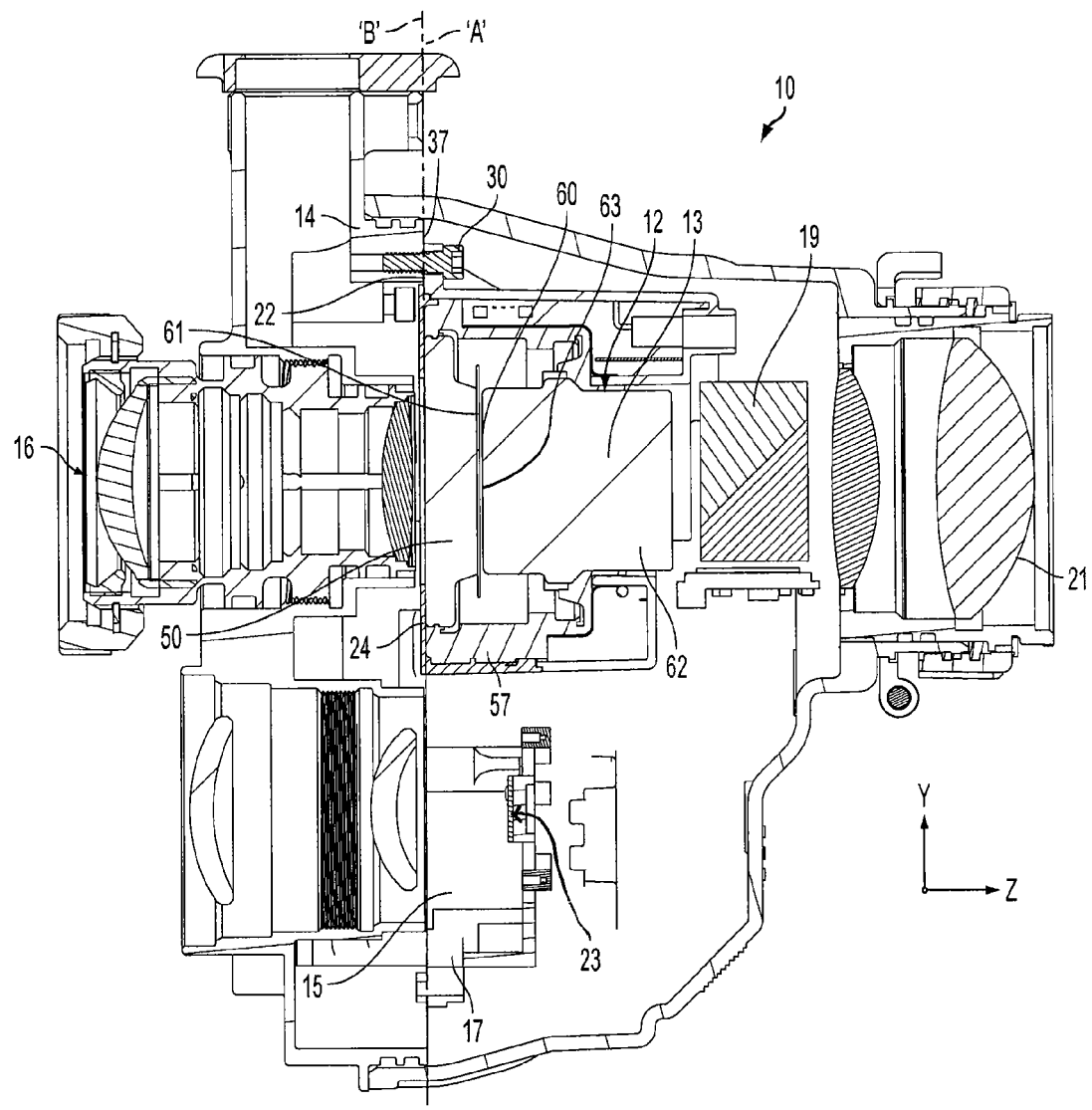
FIG. 1E depicts a cross-sectional view of the monocular of FIG. 1B taken along the lines 1E-1E, wherein several components of the monocular have been omitted.
Figure 2C:
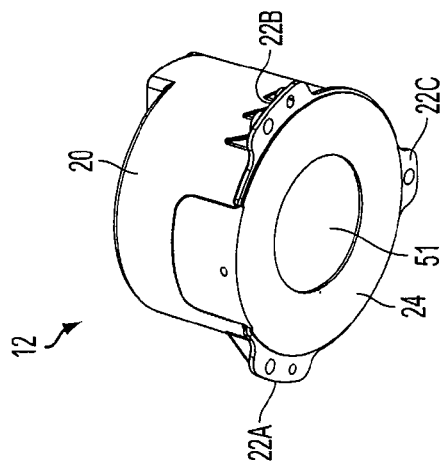
FIGS. 2B and 2C depict top-side and bottom-side perspective views, respectively, of the image intensifier tube assembly of FIG. 2A.
Figure 2B:
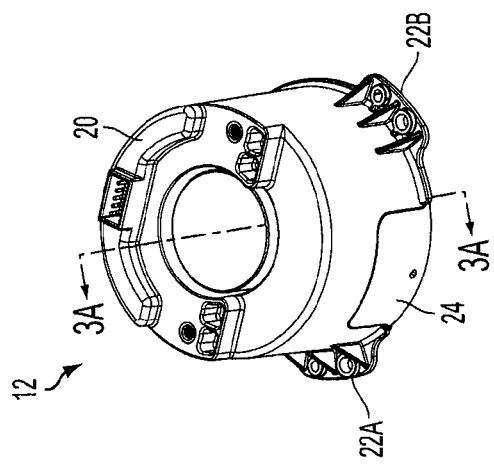
Figure 2A:
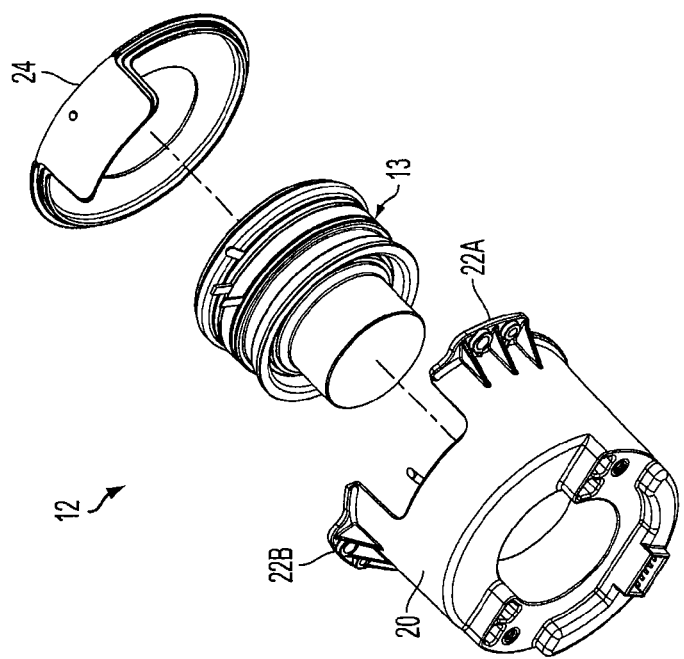
FIG. 2A depicts an exploded view of an image intensifier tube assembly of the monocular of FIGS. 1D and 1E.

FIGS. 1A-1E depict a night vision monocular 10. Monocular 10 includes an objective lens assembly 16, and an infrared focal plane array of an infrared (IR) channel 23, which are each mounted to an optical bench 14. An eyepiece 21 is positioned opposite objective lens assembly 16. As best shown in FIGS. 1D and 1E, an image intensifier tube assembly 12 is mounted to optical bench 14 collinear with objective lens assembly 16. Mounting surface 22 of image intensifier tube assembly 12, which is defined by datum plane 'A', is mounted directly to mounting surface 37 of image optical bench 14, which is defined by datum plane 'B.'

Image intensifier tube assembly 12 includes six basic components mounted within a housing 20, i.e., a glass faceplate 50, a photocathode 61 bonded to the glass faceplate 50, a micro-channel plate (MCP) 60, a phosphor screen 63, a fiber-optic inverter 62, and a power supply 57. The faceplate 50, the photocathode 61, the MCP 60, the phosphor screen 63, and the fiber-optic inverter 62 are assembled together to form an image intensifier tube 13.

Referring now to the operation of monocular 10, the objective lens 16 of monocular 10 collects available light and focuses that light on image intensifier tube assembly 12. The photocathode 61 of image intensifier tube assembly 12, which is positioned closest to objective lens 16, is the image plane and thus detects the light image from objective lens 16 and converts the light image into a corresponding electron pattern. The photocathode 61 is a negatively charged electrode that is coated with a photosensitive compound. When the photocathode 61 is struck by light, the absorbed energy causes electron emission due to the photoelectric effect. The MCP 60 of image intensifier tube assembly 12 amplifies the electron emission. The phosphor screen 63 of the fiber-optic of image intensifier tube assembly 12 transforms the amplified electron emission back to an enhanced light image. The fiber optic inverter 62 of image intensifier tube assembly 12, which is positioned closest to a beam combiner 19, inverts the enhanced light image right side up (the image was previously inverted by objective lens 16). Beam combiner 19 combines the images generated by image intensifier tube 13 and an infrared focal plane array of an infrared (IR) channel 23 into a single fused image.

The single enhanced image is displayed through eyepiece 21 for viewing by a user of monocular 10. Alternatively, the enhanced light image may be digitally presented on a display, which may be a computer monitor or a microdisplay that is positioned before a user's eye, for example. Further details of the basic structure and operation of an image intensifier tube assembly are disclosed in U.S. Pat. No. 7,482,571 to Thomas, which is incorporated by reference herein in its entirety.

FIGS. 2A-2C and 3A depict detailed views of image intensifier tube assembly 12. Image intensifier tube assembly 12 includes image intensifier tube 13 mounted within housing 20, and a cover 24 that is mounted to the bottom end of housing 20. As shown in FIGS. 1D and 1E, mounting surfaces 22A-22C of housing 20 (referred to collectively as mounting surfaces 22) are releasably mounted to optical bench 14 by three fasteners 30 (one fastener shown in FIG. 1E). Cover 24 is mounted to the bottom end of housing 20 at a location that is adjacent mounting surfaces 22 of housing 20. Upon assembling tube assembly 12 into monocular 10, cover 24 does not physically contact optical bench 14.

Figure 3A:
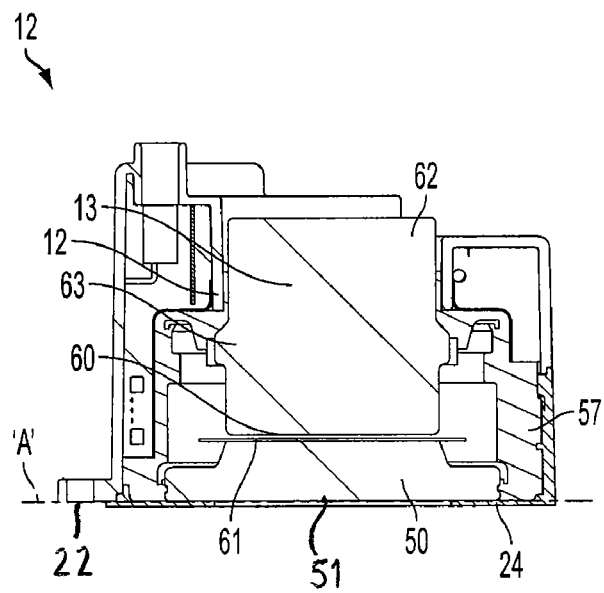
FIG. 3A depicts a cross-sectional view of the image intensifier tube assembly of FIG. 2B taken along the lines 3A-3A.

Referring now to FIG. 3A, the design of image intensifier tube assembly 12 introduces less tilt errors, alignment errors, and displacement errors which degrade line of sight and resolution of monocular 10. To achieve these benefits, faceplate surface 51 of the glass faceplate 50 is positioned on the same datum plane 'A' as the mounting surfaces 22 of image intensifier tube assembly 12. For reference purposes, faceplate surface 51 is the surface of faceplate 50 that is (i) disposed opposite photocathode 61; (ii) exposed through the cover 24 (see FIG. 2C), and (iii) positioned closest to objective lens 16 (see FIG. 1D).

Mounting surfaces 22 of image intensifier tube assembly 12 are mounted directly to mounting pads 37 of optical bench 14, and objective lens 16 is mounted directly to optical bench 14. By virtue of the coplanarity of faceplate surface 51 and mounting surface 22, coupled with the fact that both mounting surface 22 of image intensifier tube assembly 12 and objective lens 16 are mounted directly to optical bench 14, the position of image intensifier tube assembly 12 relative to objective lens 16 can be tightly controlled. This is significant because even slight misalignment between image intensifier tube assembly 12 and objective lens 16 can distort the image that is displayed to the user via eyepiece 21 of monocular 10, or via a microdisplay.

By mounting the display beam combiner 19 directly to the tube screen, the intensifier tube assembly 12 can be front-loaded. Positioning faceplate surface 51 on the same datum plane 'A' as the mounting surface 22 "front-loads" the image intensifier tube assembly 12. Front-loading the image intensifier tube assembly 12 to significantly reduces the front end tilt and eliminates the need to "back-load" an image intensifier tube to meet field curvature requirements.

Figure 3B:
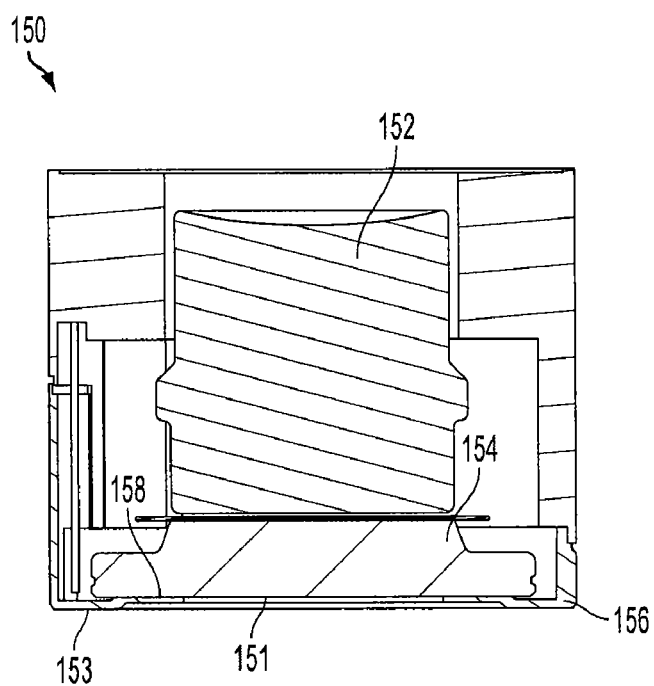
FIG. 3B depicts a cross-sectional view of another image intensifier tube assembly for comparison purposes with the image intensifier tube assembly shown in FIG. 3A.

FIG. 3B depicts a cross-sectional view of another image intensifier tube assembly 150 for the purposes of comparison with the image intensifier tube assembly 12 of FIG. 3A. The image intensifier tube assembly 150 of FIG. 3B is similar to image intensifier tube assembly 12 of FIG. 3A, i.e., both assemblies include an image intensifier tube encased within a housing and a cover mounted to the lower end of the housing. However, in image intensifier tube assembly 150 of FIG. 3B, faceplate surface 151 of image intensifier tube assembly 150 is not coplanar with mounting surface 153 of cover 156. Although not shown, the mounting surface 153 of cover 156 is mounted to an optical bench of an optical system, and an objective lens is also mounted to that optical bench.

The distance separating faceplate surface 151 from optical bench mounting surface 153 varies as a result of the dimensional tolerances of cover 156 as well as the presence of potting material 158 that is distributed between cover 156 and faceplate surface 151. Thus, the position of faceplate surface 151, and, therefore, image intensifier tube 152, can shift due to the presence of potting material 158 and the dimensional variations of cover 156. Such variations cause misalignment between image intensifier tube assembly 150 and the objective lens of the optical system (not shown), which can distort the image that is displayed to the user of the optical system.

Figure 4A:
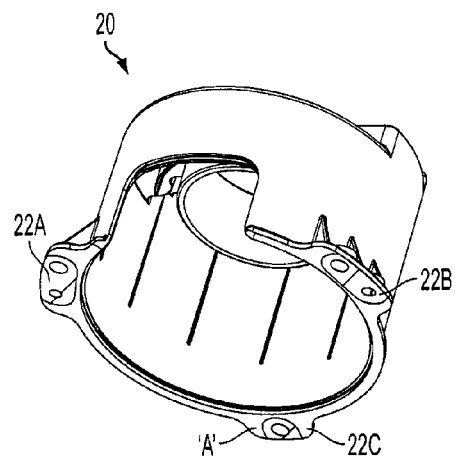
FIGS. 4A and 4B depict bottom-side and top-side perspective views, respectively, of the housing of the image intensifier tube of FIG. 3A.
Figure 4B:
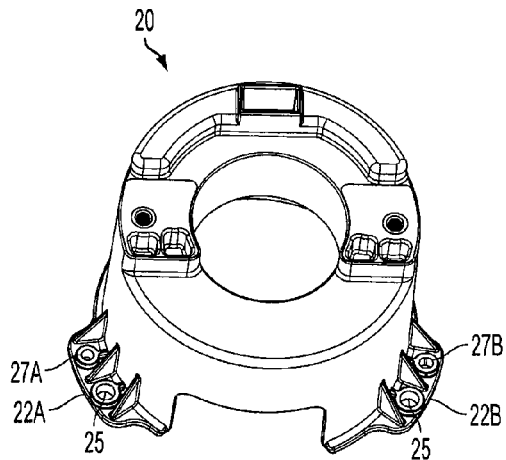
Figure 4C:
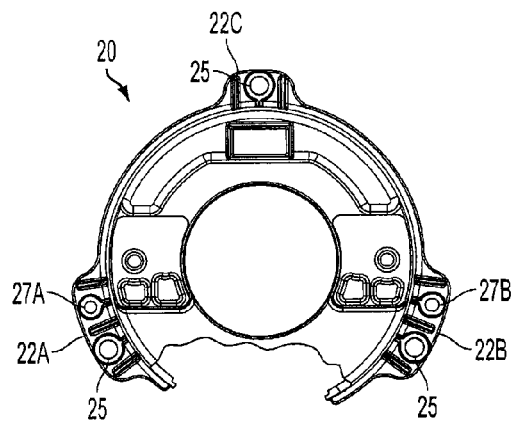
FIG. 4C depicts a segmented top plan view of the housing of FIG. 4A.
Figure 4D:
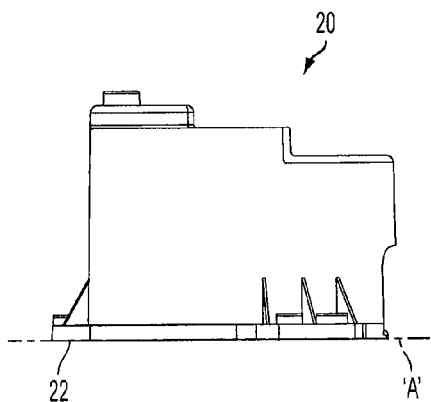
FIG. 4D depicts a side view of the housing of FIG. 4A.

FIGS. 4A-4D depict detailed views of housing 20 of image intensifier tube assembly 12. Housing 20 includes three mounting surfaces 22A, 22B and 22C (referred to collectively as mounting surfaces 22). Each mounting surface 22 extends in a radial direction away from the longitudinal axis of housing 20. As best shown in FIG. 4C, surface 22A defines a thru-hole 25 for receiving a fastener 30 (see FIG. 1E, only one fastener shown) and a circular thru-hole 27A that is sized to just receive an alignment pin 35 (shown in FIG. 5B).

Surface 22B defines a thru-hole 25 for receiving a fastener 30 (see FIG. 1E, only one fastener shown) and an ovular thru-slot 27B that is sized to just receive an alignment pin 35 (shown in FIG. 5B) and is oriented toward the thru-hole 27A. Thru-slot 27B allows for tolerance stack reduction and differing thermal expansion rates without introducing excessive stresses.

Surface 22C defines a thru-hole 25 for receiving a fastener 30, but does not include an hole or slot that is sized to receive an alignment pin.

Figure 5A:
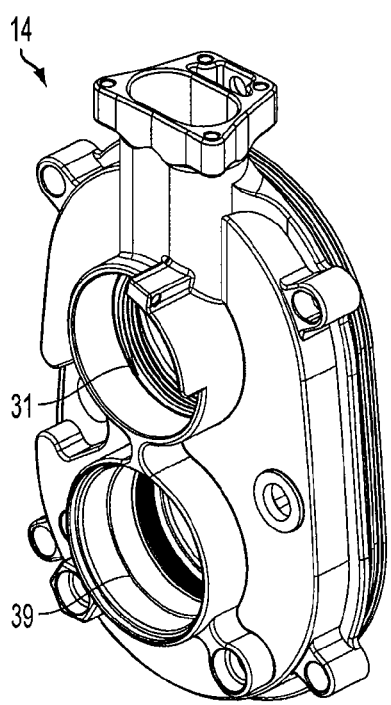
FIGS. 5A and 5B depict front-side and rear-side perspective views, respectively, of an optical bench of the monocular of FIGS. 1A-1E.
Figure 5B:
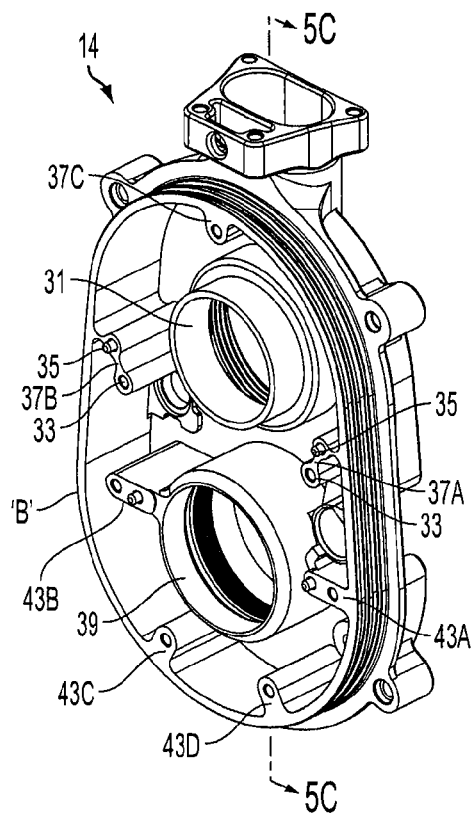
Figure 5C:
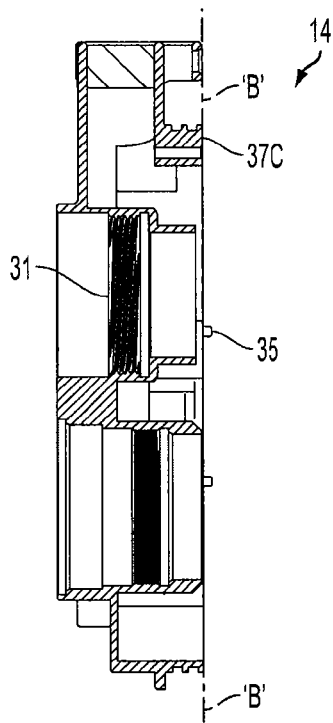
FIG. 5C depicts a cross-sectional view of the optical bench of FIG. 5B taken along the lines 5C-5C.

FIGS. 5A-5C depict detailed views of optical bench 14 of monocular 10. Optical bench 14 includes an objective lens bore 31 for mountably receiving objective lens assembly 16 and a lens bore 39 for mountably receiving another lens assembly for the infrared (IR) channel. The optical bench 14 includes three mounting pads 37A-37C (referred to collectively as pads 37), upon which image intensifier tube assembly 12 is mounted, and four mounting pads 43A-43D upon which an IR camera is mounted. All seven mounting pads (i.e., pads 37A-37C and pads 43A-43D) are coplanar and define datum plane 'B.'

Each image intensifier tube mounting pad 37 includes a threaded hole 33 for receiving a fastener 30 (see FIG. 1E, only one fastener shown). Two alignment pins 35 are fixedly positioned in holes that are defined on mounting pads 37A and 37B. In assembled form of monocular 10, the alignment pin 35 of mounting pad 37A is positioned through thru-hole 27A of housing 20 and the alignment pin 35 of mounting pad 37B is positioned through thru-slot 27B of housing 20 to accurately align the image intensifier tube assembly 12 onto optical bench 14. The alignment pins 35 also act as secondary and tertiary datums for locating objective lens bore 31 in the process of manufacturing the optical bench.

Figure 6A:
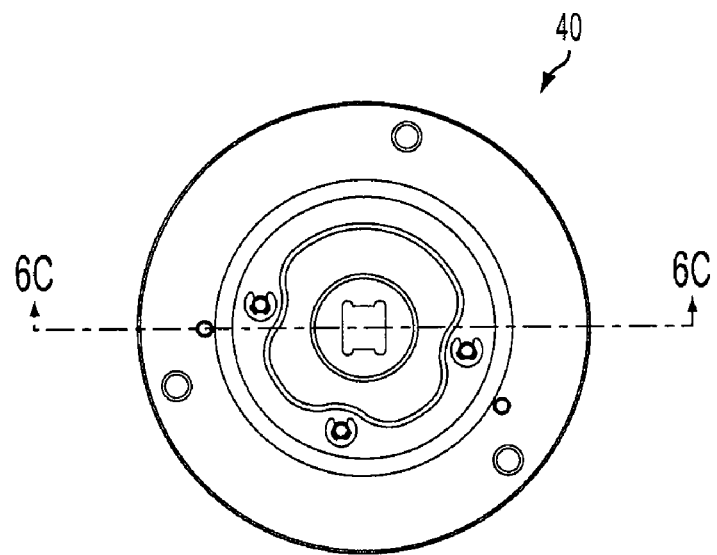
FIGS. 6A and 6B depict top plan and side elevation views, respectively, of a fixture for assembling the image intensifier tube assembly of FIG. 2A.
Figure 6B:
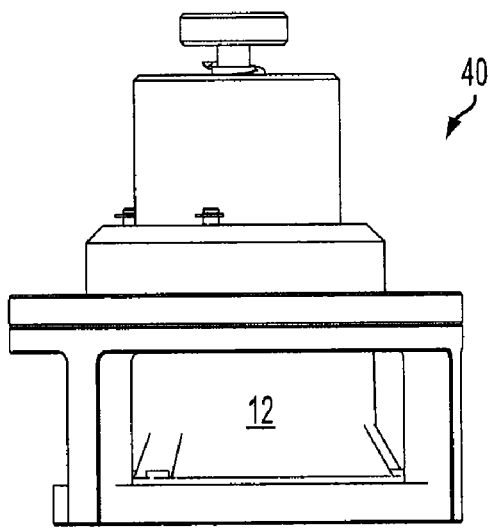
Figure 6C:
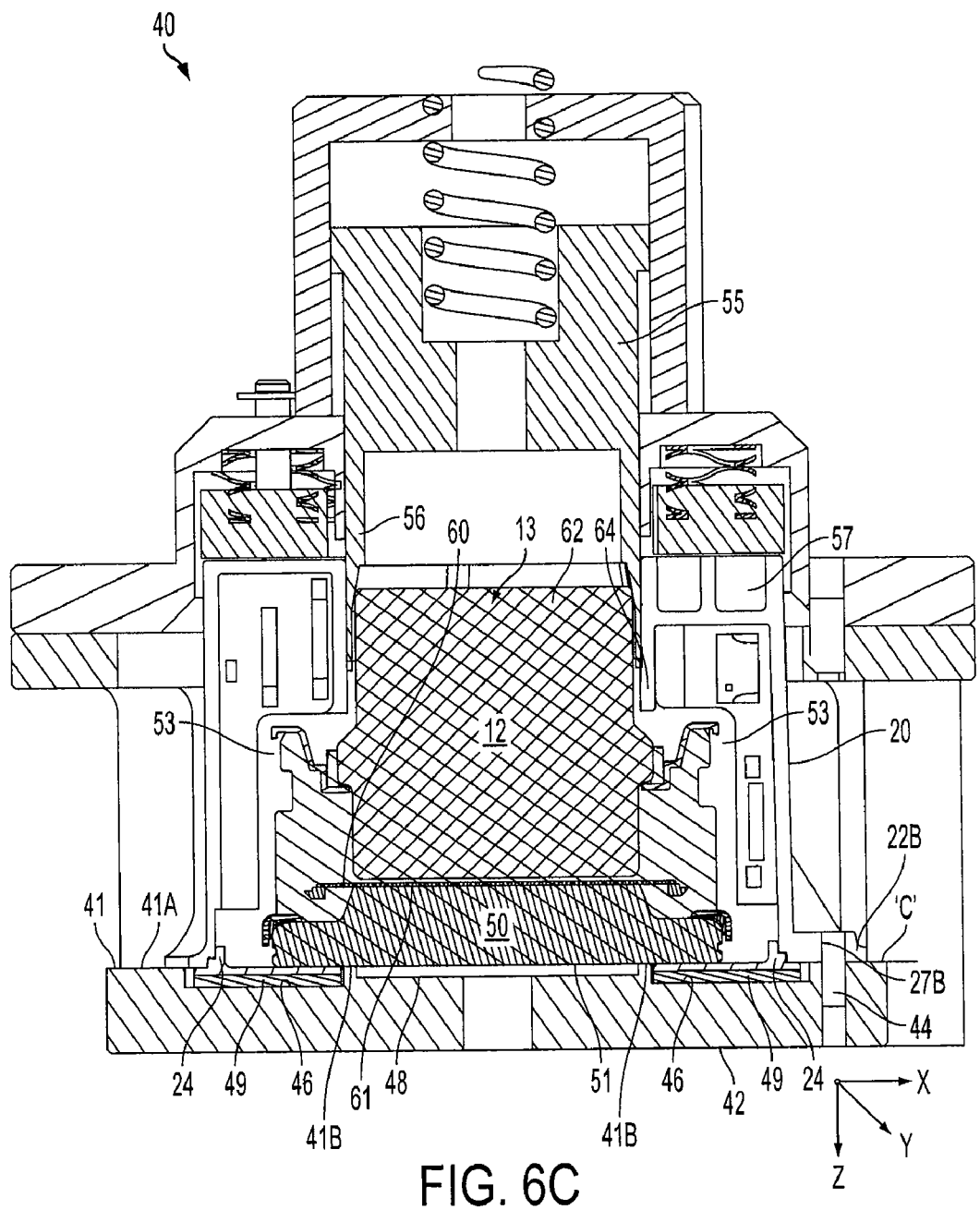
FIG. 6C depicts a cross-sectional view of the fixture of FIG. 6A taken along the lines 6C-6C, wherein the image intensifier tube assembly of FIG. 2A is shown positioned in the fixture.

FIGS. 6A-6C depict a fixture 40 for assembling image intensifier tube assembly 12. Fixture 40 is configured to orient the image intensifier tube 13 along the X, Y and Z axes with respect to image intensifier tube housing 20. As best shown in FIG. 6C, fixture 40 includes a base plate 42 having a top surface 41 defining a datum plane 'C.' Surface 41 consists of two coplanar surfaces which define datum plane 'C', i.e., outer surface 41A supports mounting surfaces 22A-22C of image intensifier tube housing 20 whereas interior surface 41B supports the image intensifier tube faceplate 50.

Two pins 44 (one shown) are fixedly positioned in holes that are defined on outer surface 41A of base plate 42. The pins 44 extend above top surface 41 of base plate 42. The alignment pins 44 are sized to be positioned in thru-hole 27A and thru-slot 27B of image intensifier tube housing 20. Alignment pins 44 control the position of image intensifier tube 13 along the X and Y axes.

An annular recess 46 extends from top surface 41 of base plate 42 to accommodate and support the cover 24 during the potting process. Recess 46 is significant in that it permits mounting surfaces 22 of image intensifier tube housing 20 to reside on the same plane (i.e., datum plane 'C') as faceplate surface 51 of image intensifier tube 13 while accommodating cover 24. Conventional designs, which allow for the distribution of potting material between a cover and a faceplate, may undesirably introduce tilt and displacement to the optical alignment, as previously discussed with reference to FIG. 3B.

Annular recess 46 is sized to receive cover 24 such that cover 24 does not physically contact top surface 41 of base plate 42. In other words, recess 46 permits image intensifier tube cover 24 to reside at an elevation beneath datum plane 'C.' An annular-shaped foam pad 49 is positioned within recess 46 to prevent damage to cover 24 during the process of assembling image intensifier tube assembly 12. Foam pad 49 also limits the distribution of potting material between cover 24 and faceplate 50.

A second recess 48 extends from top surface 41 of base plate 42 to reduce the surface area contact between glass faceplate 50 and top surface 41 of base plate 42, thereby preventing scratches in the active area of image intensifier tube 13. The annular ring that forms interior surface 41B is outside the active area of image intensifier tube 13.

Referring now to an exemplary method of assembling image intensifier tube assembly 12, the faceplate 50, photocathode 61, MCP 60 and fiber optic inverter 62 are joined together by a brazing operation to form image intensifier tube 13 of image intensifier tube assembly 12. The brazed image intensifier tube 13 is then placed inside image intensifier tube housing 20 which contains power supply 57. Image intensifier tube cover 24 is snapped onto image intensifier tube housing 20, thereby encapsulating image intensifier tube 13.

The partially-assembled image intensifier tube assembly 12 is then loaded onto base plate 42 of fixture 40 by positioning pins 44 (see FIG. 6C) of fixture base plate 42 through thru-hole 27A and thru-slot 27B of image intensifier tube housing 20. The mounting surfaces 22 of image intensifier tube housing 20 and faceplate surface 51 of faceplate 50 are both positioned on surfaces 41A and 41B, respectively, of base plate 42. In other words, mounting surface 22 of image intensifier tube housing 20 and faceplate surface 51 of faceplate 50 are both positioned on datum plane 'C' of base plate 42.

The piston 55 of fixture 40 is driven downwardly toward image intensifier tube assembly 12. The annular segment 56 of piston 55 of fixture 40 is translated into the annular space that separates wall 64 of housing 20 and the cylindrical exterior surface of fiber optic inverter 62. While piston 55 is driven downwardly, the annular segment 56 of piston 55 of fixture 40 aligns image intensifier tube 13 along the X and Y axes (see FIG. 6C for axes) with respect to alignment pins 44 and thru-hole/slot 27 of housing 20. The relative positions of annular segment 56 of piston 55 and alignment pins 44 is closely controlled. An active alignment system (not shown) may be used to move image intensifier tube 13 relative to the thru-hole/slot 27 by using an optical closed feedback loop if tight alignment is required.

The piston 55 also urges image intensifier tube housing 20 and image intensifier tube 13 in a downward Z direction against top surface 41 (i.e., datum plane 'C') such that both mounting surface 22 of image intensifier tube housing 20 and faceplate surface 51 of image intensifier tube assembly 12 are co-planar (i.e., flush) and reside on the same datum plane 'C.'

Potting material is then distributed into cylindrical recess 53 defined between power supply 57, image intensifier tube housing 20, cover 24 and image intensifier tube 13. The potting material is permitted to cure, thereby completing the assembly process of image intensifier tube assembly 12. Although not shown, a small amount of potting material is also distributed between the internal top surface of cover 24 and the faceplate surface 51, however, this potting material has no effect on the position of image intensifier tube 13 with respect to mounting surface 22 of housing 20.

Referring back to FIGS. 1D and 1E, once image intensifier tube assembly 12 is potted as described above, it is ready to be mounted to optical bench 14 of monocular 10. The pins 35 of optical bench 14 are first positioned through complimentary thru-hole 27A and thru-slot 27B of image intensifier tube housing 20 (or vice versa). The optical bench 14 and image intensifier tube housing 20 are translated toward each other until mounting surfaces 22 of image intensifier tube assembly 12 abut mounting surface 37 of optical bench 14. Thru-slot 27B of image intensifier tube housing 20 permits slight translation and slight rotation of image intensifier tube assembly 12 with respect to optical bench 14. The image intensifier tube assembly 12 is translated, either manually or robotically, along the X and Y axes and rotated about the Z axis (axes are shown in FIGS. 1D and 1E) to align image intensifier tube assembly 12 with a target image (not shown) until the predetermined resolution, image alignment and field curvature requirements of monocular 10 are satisfied.

Epoxy (or other liquid adhesive) is then applied to alignment pins 35 and distributed within thru-hole 27A and thru-slot 27B of housing 20 to join image intensifier tube housing 20 to optical bench 14. The epoxy can be easily removed to realign the image intensifier tube assembly 12, if necessary. It should be understood that the exemplary assembly methods described above are not limited to any particular step or sequence of steps.

Actively aligning image intensifier tube assembly 12 at its finished build state results in extremely accurate positioning of image intensifier tube assembly 12. In contrast, the position of a conventional intensified image intensifier tube may shift even after the image intensifier tube is mounted to the optical bench as a result of variances in cured potting compound. Additionally, actively aligning image intensifier tube assembly 12 at its finished build state eliminates the need to use specialized gas for pre-potting alignment in a direct view image intensifier tube.

Figure 7:
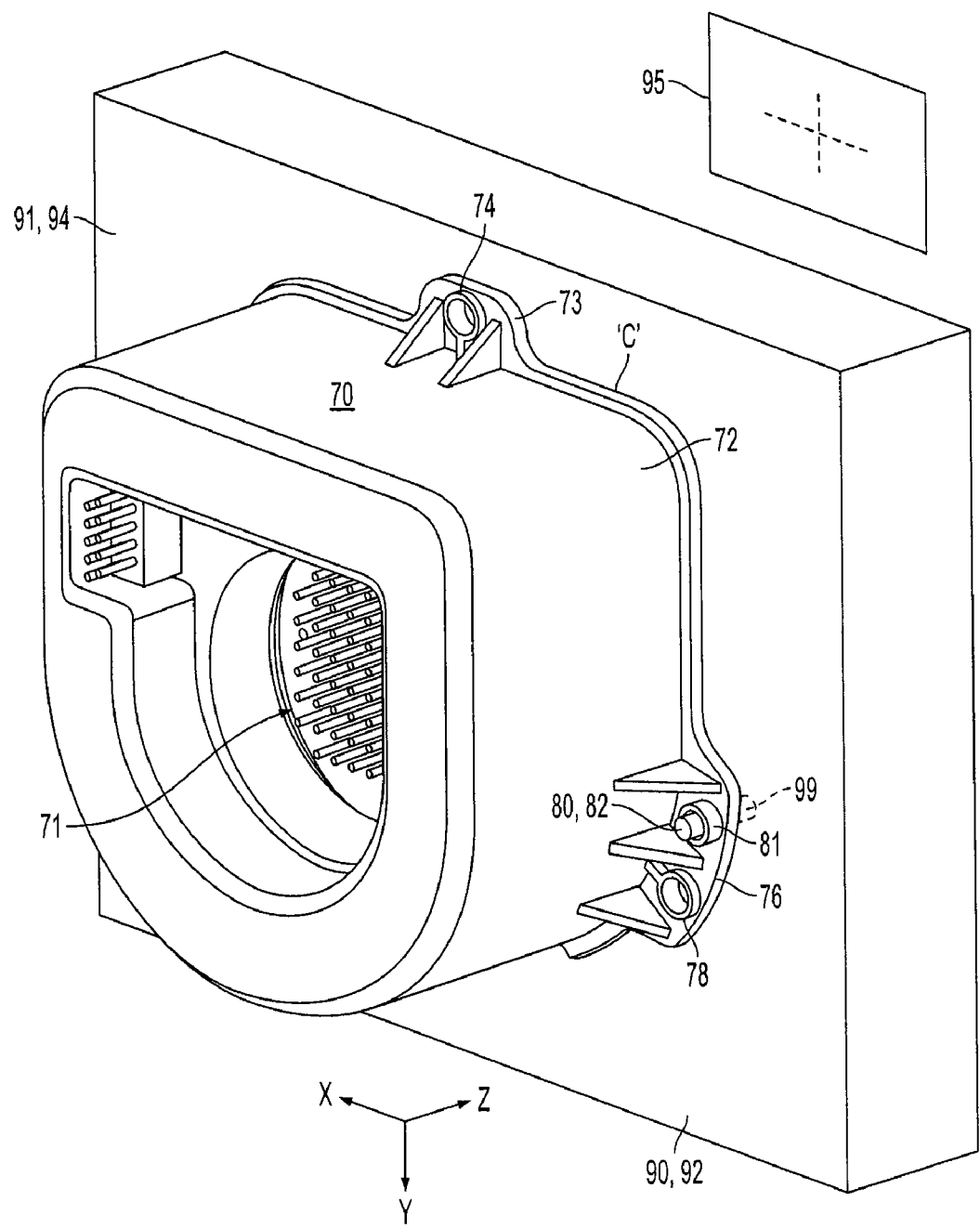
FIG. 7 depicts a digital sensor assembly according to another exemplary embodiment of the invention.

Referring now to FIG. 7, the aforementioned benefits of epoxy (or other liquid adhesive) also apply to a digital sensor of an optical system. FIG. 7 depicts a digital sensor assembly 70 according to another exemplary embodiment of the invention. The digital sensor assembly 70 includes a digital sensor 71, which may be a CMOS or CCD chip, mounted within a housing 72. Housing 72 is similar to housing 20 in that it includes three mounting surfaces (only surfaces 73 and 76 are shown). All three mounting surfaces are arranged on datum plane 'C.'

Mounting surface 73 includes a thru-hole 74 that is sized to receive a fastener (not shown). Mounting surface 76 includes a thru-hole 78 that is sized to receive a fastener (not shown) and a thru-hole 81 that is sized to receive a pin 80. The third mounting surface that is not shown in FIG. 7 includes a thru-hole 78 and a thru-slot. Thru-holes 81 may be formed in housing 72 (as shown). Alternatively, according to another exemplary embodiment, item 80 represents a bushing that is inserted into thru-hole 78.

The digital sensor assembly 70 is mounted to an optical bench 90 of an optical system. The optical bench 90 is shown schematically in FIG. 7, and may be similar to optical bench 14 of FIGS. 1A-1E. Two alignment pins 80 are fixed to optical bench 90 and protrude from the mounting surface 91 of optical bench 90. Each alignment pin 80 is sized to be positioned within a thru-hole 81 and thru-slot of digital sensor housing 72.

Two different methods for aligning digital sensor assembly 70 to an optical bench 90 of an optical system are described hereinafter. According to a first method of assembling digital sensor assembly 70 to optical bench 90, two alignment pins 80 are inserted through complimentary thru-hole 81 and a thru-slot of digital sensor housing 72. The optical bench 90 and digital sensor assembly 70 are translated toward each other until datum plane 'C' of digital sensor assembly 70 abuts mounting surface 91 of optical bench 90.

The digital sensor assembly 70 is then manually translated along the X and Y axes and rotated about the Z axis (axes are shown in FIG. 7) relative to a target image 95 (shown schematically) to meet pre-determined resolution, field curvature, center pixel alignment and scan line alignment requirements. Once the desired position of digital sensor assembly 70 is established, epoxy is applied to alignment pins 80 and distributed within thru-holes 81 of digital sensor housing 72 to join digital sensor assembly 70 to optical bench 90. The epoxy can be easily removed to realign digital sensor assembly 70, if necessary.

A fastener (not shown) is inserted through each thru-hole 78, 74 of housing 72 and threaded into a complimentary threaded hole of the optical bench to mount digital sensor assembly 70 to optical bench 90. It has been discovered that actively aligning digital sensor assembly 70 at its finished build state results in extremely accurate positioning of digital sensor assembly 70. It should be understood that the exemplary assembly methods described above are not limited to any particular step or sequence of steps.

According to a second method of assembling digital sensor assembly 70 to optical bench 90 of an optical system, an alignment bench 92 is employed to pre-align digital sensor assembly 70 before it is mounted to optical bench 90. Although optical bench 90 and alignment bench 92 may be entirely different, they are schematically represented by the same object in FIG. 7. The alignment bench 92 includes two alignment pins 82 protruding from a mounting surface 94 of alignment bench 92. Alignment pins 82 of alignment bench 92 are first inserted through complimentary thru-hole 81 and a thru-slot (not shown) of digital sensor housing 72. The alignment bench 92 and digital sensor assembly 70 are then translated toward each other until datum plane 'C' of digital sensor assembly 70 abuts mounting surface 94 of alignment bench 92.

The digital sensor assembly 70 is manually translated along the X and Y axes and rotated about the Z axis (axes are shown in FIG. 7) relative to a target image to meet pre-determined resolution, field curvature, center pixel alignment and scan line alignment requirements of the optical system into which digital sensor assembly 70 is mounted. Once the desired position of digital sensor assembly 70 is established, epoxy (or any other liquid adhesive) is applied to alignment pins 82 and distributed within thru-hole 81 and a thru-slot of digital sensor housing 72 to join alignment pins 82 to digital sensor assembly 70. Once the epoxy cures, the digital sensor housing 72 and its epoxied alignment pins 82 are easily removed from the alignment bench 92. The digital sensor assembly 70 is then ready for mounting to optical bench 90.

The alignment pins 82 are inserted through complimentary holes 99 (one shown) that are disposed in optical bench 90. The optical bench 90 and digital sensor assembly 70 are translated toward each other until datum plane 'C' of digital sensor assembly 70 abuts mounting surface 91 of optical bench 90. A fastener (not shown, but similar to fastener 30 of FIG. 1E) is inserted through each thru-hole 78, 74 of housing 72 and threaded into a complimentary threaded hole of optical bench 90 to mount digital sensor assembly 70 to optical bench 90.

It should be understood that the exemplary assembly methods described above are not limited to any particular step or sequence of steps. Additionally, although the steps of the assembly methods are described with reference to digital sensor assembly 70 of FIG. 7, those steps may also apply to image intensifier tube assembly 12 of FIGS. 1A-1E.

Although the invention is illustrated and described herein with reference to specific embodiments, the invention is not intended to be limited to the details shown. Rather, various modifications may be made in the details within the scope and range of equivalents of the claims and without departing from the spirit of the invention. For example, the details of the invention are not limited to a monocular, and may apply to any optical system, such as, for example, a camera, camcorder, night vision goggle, or a night vision scope.

What is claimed:

1. In an optical system including an optical bench and an imaging device that is configured to be mounted to the optical bench, a method of assembling the imaging device onto the optical bench comprises the steps of:

inserting an alignment pin, which extends from a mounting surface of an alignment fixture, into a hole defined in the imaging device;

aligning the imaging device with respect to a target image by translating and/or rotating the imaging device on the mounting surface of the alignment fixture while the pin is inserted in the hole to meet pre-defined center pixel, scan line and/or resolution requirements of the optical system;

applying epoxy or other liquid adhesive to the pin and the hole to join the pin to the imaging device;

removing the pin and the imaging device from the alignment fixture without shifting the position of the pin with respect to the hole of the imaging device; and inserting the pin of the imaging device into a hole defined in the optical bench to assemble the imaging device onto the optical bench.

2. The method of claim 1 further comprising the step of mounting an objective lens to the optical bench.

3. The method of claim 1, wherein the imaging device is a CCD (charge coupled device) or a CMOS (complementary metal oxide semiconductor).

4. The method of claim 1 further comprising the step of mounting the imaging device in an imaging device housing prior to the inserting step.

5. The method of claim 1, wherein the inserting step comprises inserting two pins each extending from the mounting surface of the alignment fixture into two holes defined in the imaging device.

6. The method of claim 1 further comprising the step of fastening the optical bench to the imaging device using at least one fastener.

7. The method of claim 1, wherein the alignment pin is provided in the form of a bushing.

8. In an optical system including an imaging device that is configured to be mounted to an optical bench, a method of aligning the imaging device with respect to a target image comprises the steps of:

inserting an alignment pin, which extends from a mounting surface of an alignment fixture, into a hole defined in the imaging device;

aligning the imaging device with respect to a target image by translating and/or rotating the imaging device on the mounting surface of the alignment fixture while the pin is inserted in the hole to meet pre-defined center pixel, scan line and/or resolution requirements of the optical system; and applying epoxy or other liquid adhesive to the pin and the hole to join the pin to the imaging device.

9. The method of claim 8 further comprising the steps of removing the pin and the imaging device from the alignment fixture without shifting the position of the pin with respect to the hole of the imaging device; and inserting the pin of the imaging device into a hole defined in the optical bench to assemble the imaging device onto the optical bench.

10. The method of claim 8, wherein the imaging device is a CCD (charge coupled device) or a CMOS (complementary metal oxide semiconductor).

11. The method of claim 8 further comprising the step of mounting the imaging device in an imaging device housing prior to the inserting step.

12. The method of claim 8, wherein the inserting step comprises inserting two pins each extending from the mounting surface of the alignment fixture into two holes defined in the imaging device.

13. The method of claim 8, wherein the alignment pin is provided in the form of a bushing.

* * * * *